Patented Oct. 18, 1949

2,484,976

UNITED STATES PATENT OFFICE 2,484,976

STARRING MIXTURE FOR ANTIMONY SMELTING

Chung Yu Wang, New York, N. Y.

No Drawing. Application August 19, 1948, Serial No. 45,200

6 Claims. (Cl. 75—69)

The present invention relates to a starring mixture, slag, or converture used in the refining of antimony.

The prime object of the present invention is to produce a slag or starring mixture which does not contain any iron or antimony compound.

Another object of this invention is to improve the invention of Chung Yu Wang for which United States Patent 1,284,164 was granted November 5, 1918, by using a new ingredient in place of iron sulfide mentioned in that patent, and which new ingredient is capable of producing an improved result when used for the purpose described herein.

The composition of an ordinary starring mixture, slag or converture for producing the fernlike structure or stars on the surface of the antimony regulus consists of either a mixture of antimony trioxide and carbonate of sodium, or a mixture of antimony sulfide and potassium carbonate, or a mixture of antimony tetroxide or antimony trioxide, antimony sulfide, carbonate of sodium and carbon. In all these mixtures, it will be noted that an antimony compound is employed.

The United States Patent 1,284,164, granted November 5, 1918, to Chung Yu Wang, discloses and claims a starring mixture utilizing iron sulfide as a replacement for one of the aforementioned antimony compounds. However, it has been found that the use of iron sulfide, as an ingredient in the starring mixture, sometimes gives rise to contamination of iron in the antimony regulus. Now, it has been found that by using certain new ingredient in proper proportion, not only are antimony compounds found to be unnecessary but also the use of iron sulfide is no longer required. In addition, the quality of the fernlike structure or stars on the surface of the antimony is greatly improved which results in improved appearance and acceptance of the end product antimony.

The new starring mixture of the composition herein described is more fluid and pours more readily than any of the antimony containing starring mixtures as described in metallurgical literature and as practiced in modern antimony works. In addition, the present invention makes use of ingredients cheaper than those containing antimony compounds.

The improved starring mixture which is the subject of this invention uses the following ingredients in proper proportion:

Sodium sulfide
Potassium carbonate

The exact proportions are here used for the purpose of illustration and are not in any way intended to limit the present invention.

Such a starring mixture when used with refined antimony regulus, resulting from whatsoever process, will produce the desired fernlike structure or stars which come to appear on the surface of the refined antimony metal while it is cooling.

Typical mixtures contain the following proportions:

|  | Parts in weight |
|---|---|
| 1. Sodium sulfide | 40 |
| Potassium carbonate | 40 |
| 2. Sodium sulfide | 45 |
| Potassium carbonate | 40 |
| 3. Sodium sulfide | 50 |
| Potassium carbonate | 40 |
| 4. Sodium sulfide | 55 |
| Potassium carbonate | 40 |
| 5. Sodium sulfide | 60 |
| Potassium carbonate | 40 |

Further, it may be mentioned that part of the potassium carbonate can be replaced by sodium carbonate. Other proportions of these may be used, the above-mentioned proportions being given for illustration and being in no way to limit the scope of the invention as described in the following claims.

I claim:

1. A starring mixture for use in antimony smelting, which consists of a mixture of sodium monosulfide and potassium carbonate.

2. A starring mixture for use in antimony smelting which comprises essentially sodium monosulfide and potassium carbonate.

3. The starring mixture for use in antimony smelting defined in claim 2, which contains additionally a small amount of sodium carbonate.

4. A starring mixture for use in antimony smelting which consists essentially of sodium monosulfide and potassium carbonate, said sodium monosulfide being present in proportions, by weight, ranging from one to one and one-half parts for each part of potassium carbonate present in said starring mixture.

5. The starring mixture for use in antimony smelting defined in claim 4, which contains, additionally, a small quantity of sodium carbonate.

6. A starring mixture for use in antimony smelting which consists of sodium monosulfide and potassium carbonate, there being present from forty to sixty parts of sodium monosulfide, by weight, for each forty parts of potassium carbonate present in said mixture.

CHUNG YU WANG.

REFERENCES CITED

The following references are of record in the file of this patent:

UNITED STATES PATENTS

| Number | Name | Date |
|---|---|---|
| 1,284,164 | Wang | Nov. 5, 1918 |

OTHER REFERENCES

Colclough, "Desulphurisation of Pig-Iron and Steel," The Iron and Coal Trades Review, Sept. 3, 1937, p. 362.